(12) United States Patent
Hong et al.

(10) Patent No.: US 10,962,858 B2
(45) Date of Patent: Mar. 30, 2021

(54) LOW-PROFILE MULTI-BAND HYPERSPECTRAL IMAGING FOR MACHINE VISION

(71) Applicant: SZ DJI TECHNOLOGY CO., LTD., Shenzhen (CN)

(72) Inventors: Xiaoping Hong, Shenzhen (CN); Mingyu Wang, Shenzhen (CN); Huai Huang, Shenzhen (CN)

(73) Assignee: SZ DJI Technology Co., Ltd., Shenzhen (CN)

( * ) Notice: Subject to any disclaimer, the term of this patent is extended or adjusted under 35 U.S.C. 154(b) by 0 days.

(21) Appl. No.: 16/582,705

(22) Filed: Sep. 25, 2019

(65) Prior Publication Data

US 2020/0019039 A1   Jan. 16, 2020

Related U.S. Application Data

(63) Continuation of application No. PCT/CN2017/079369, filed on Apr. 1, 2017.

(51) Int. Cl.
*G03B 11/00* (2006.01)
*G06T 7/55* (2017.01)
(Continued)

(52) U.S. Cl.
CPC ............. *G03B 11/00* (2013.01); *G02B 5/201* (2013.01); *G02B 26/007* (2013.01); *G06T 7/55* (2017.01);
(Continued)

(58) Field of Classification Search
None
See application file for complete search history.

(56) References Cited

U.S. PATENT DOCUMENTS 5,315,384 A * 5/1994 Heffington ............ H04N 9/097
                                                   348/340
9,173,554 B2 * 11/2015 Fengler ................ A61B 1/045
(Continued)

FOREIGN PATENT DOCUMENTS

CN          1451230 A    10/2003
CN        101427372 A     5/2009
(Continued)

OTHER PUBLICATIONS

International Search Report from the State Intellectual Property Office of the P.R. China for International Application No. PCT/CN2017/079369, dated Jan. 2, 2018 (4 pages).

*Primary Examiner* — Reza Aghevli
(74) *Attorney, Agent, or Firm* — Finnegan, Henderson, Farabow, Garrett & Dunner, LLP (57) ABSTRACT

A novel imaging system is provided for capturing imaging data. According to the disclosed embodiments, the imaging system comprises one or more cameras configured to capture the same scene within each camera's field of view. The imaging system also includes a plurality of bandpass filters that may be positioned in front of one or more cameras. Each bandpass filter may allow the transmission of incident electromagnetic signals between different pairs of first and second wavelengths. Accordingly, when the bandpass filters are positioned in front of the one or more cameras, each camera captures a different spectral image, i.e., containing only certain frequency components of the same scene being imaged in the cameras. The bandpass filters may be selectively aligned with one or more cameras by rotating and/or translating the filters relative to the cameras' positions in the imaging system.

24 Claims, 8 Drawing Sheets

(51) Int. Cl.
*G02B 26/00* (2006.01)
*G02B 5/20* (2006.01)
*H04N 5/225* (2006.01)
*H04N 5/247* (2006.01)
*H04N 5/265* (2006.01)
*G03B 15/00* (2021.01)

(52) U.S. Cl.
CPC ........... *H04N 5/2254* (2013.01); *H04N 5/247* (2013.01); *H04N 5/265* (2013.01); *G03B 15/006* (2013.01); *G06T 2207/10036* (2013.01)

(56) References Cited

U.S. PATENT DOCUMENTS

| | | | | |
|---|---|---|---|---|
| 9,706,139 | B2* | 7/2017 | Nussmeier | H04N 5/2257 |
| 10,258,860 | B2* | 4/2019 | Meetin | A63B 71/0622 |
| 10,288,500 | B2* | 5/2019 | Meetin | G01L 5/0052 |
| 2004/0056966 | A1* | 3/2004 | Schechner | H04N 5/23238 |
| | | | | 348/229.1 |
| 2006/0054782 | A1* | 3/2006 | Olsen | H04N 5/335 |
| | | | | 250/208.1 |
| 2013/0155723 | A1* | 6/2013 | Coleman | G02B 6/0018 |
| | | | | 362/621 |
| 2015/0036014 | A1* | 2/2015 | Lelescu | G06T 5/001 |
| | | | | 348/218.1 |
| 2015/0164335 | A1* | 6/2015 | Van Der Poel | A61B 5/0088 |
| | | | | 433/29 |
| 2015/0253487 | A1* | 9/2015 | Nichol | G02B 6/0036 |
| | | | | 362/610 |
| 2015/0260887 | A1 | 9/2015 | Salisbury et al. | |
| 2016/0182821 | A1* | 6/2016 | Shabtay | G02B 7/36 |
| | | | | 348/239 |
| 2016/0255941 | A1* | 9/2016 | Yang | G02B 5/0263 |
| 2016/0290912 | A1* | 10/2016 | Kent | G01N 15/1475 |
| 2016/0323518 | A1* | 11/2016 | Rivard | H04N 5/232933 |
| 2017/0059447 | A1* | 3/2017 | Ruprecht | G01M 11/0292 |
| 2017/0122725 | A1* | 5/2017 | Yeoh | G06T 15/20 |
| 2018/0117410 | A1* | 5/2018 | Meetin | A63B 71/0622 |
| 2018/0196246 | A1* | 7/2018 | Bares | G01J 3/0208 |
| 2018/0232047 | A1* | 8/2018 | Yoon | G06T 7/80 |
| 2019/0286053 | A1* | 9/2019 | Ozcan | G03H 1/04 |

FOREIGN PATENT DOCUMENTS

| | | |
|---|---|---|
| CN | 205265783 U | 5/2016 |
| KR | 10-2011-0066571 A | 6/2011 |
| WO | WO-2009/117483 A1 | 9/2009 |

* cited by examiner

LOW-PROFILE MULTI-BAND HYPERSPECTRAL IMAGING FOR MACHINE VISION

CROSS-REFERENCE TO RELATED PATENT APPLICATIONS

This application is a continuation application of International Application No. PCT/CN2017/079369, filed Apr. 1, 2017, which is hereby incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention generally relates to an imaging system and, more particularly, relates to a multi-band hyperspectral imaging system that may be deployed in various systems, such as aerial vehicles and platforms, autonomous vehicles, boats, or robots, that use machine vision.

BACKGROUND

Red-Green-Blue (RGB) multi-band imaging systems have been used to accurately capture color images. The typical RGB imaging system includes three separate image sensors, each matched with a corresponding red, green, or blue optical filter. When a scene is captured by an RGB camera, e.g., corresponding to an image in the camera's field of view, the image of the scene is separately filtered by the red, green, and blue filters and captured by the camera's image sensors. The resulting R, G, and B filtered images on the three color channels may be weighted and combined to more closely resemble the color spectra that would be detected by the human eye. Because computer vision systems do not have the spectral limitations of the human eye, there is a need for new types of imaging systems that can accurately capture spectrums (e.g., frequencies and frequency bands) outside of human vision.

Hyperspectral imaging systems provide more spectral information for an imaged scene than is possible using conventional RGB cameras. The spectral response range of a camera is generally the entire spectrum that can be detected by the camera's image sensor, e.g., which may be a Charge Coupled Device (CCD) or Complementary Metal-On-Semiconductor (CMOS) sensor. Unlike RGB cameras, hyperspectral imaging systems capture image data across the entire spectral response range of a camera and provide better spectral resolution and more well-defined and isolated spectral bands than are possible using RGB cameras. Hyperspectral imaging systems are typically categorized as either point scan or line scan systems or pixelated coating systems. As used herein, a hyperspectral imaging system is not limited to any particular numbers or distributions of spectral bands and includes any imaging system that captures spectral data for an image across a plurality of different spectral bands (e.g., measured in frequencies or wavelengths) not limited to conventional RGB bands.

Existing hyperspectral imaging systems suffer several disadvantages that make them undesirable to use in many machine-vision applications. For example, these hyperspectral systems are bulky, complicated, and costly because of their many optical spectroscopic components and their complicated operating principles. As a result, the current hyperspectral systems are not suitable for consumer use.

Further, a typical point-scan or line-scan imaging system has a very high spectral resolution (e.g., around 3 nm) and takes an exorbitant amount of time to scan a camera's entire spectral response range (e.g., 400 nm to 1000 nm) because of this high spectral resolution. Objects in a camera's captured image normally have features and variations on the order of 50 nm or above, which do not need processing at the much higher spectral resolution of around 3 nm. In addition, because spatial resolutions of image sensors are typically inversely proportional to their spectral resolutions, the spatial resolutions of the point-scan and line-scan imaging systems are insufficient for many machine vision applications. The conventional pixelated coating systems similarly sacrifice spatial resolution and further suffer the disadvantage of requiring complicated optics for imaging, for example, because they use a single optical lens system to image different areas within the same scene.

There is a need for an improved hyperspectral imaging system that is cost effective and suitable for use in imaging systems of consumer products, such as unmanned aerial vehicles (UAV). The hyperspectral system should be suitable for use in a multitude of machine vision applications, including but not limited to UAVs, object and pattern recognition, machine learning, material analysis, agriculture analysis, food analysis, robotics, autonomous driving, and any other systems that stand to benefit from cheaper, smaller, and less complicated alternatives for using hyperspectral camera systems.

SUMMARY

The present invention overcomes the disadvantages of the prior art by providing novel hyperspectral imaging systems and techniques that may be used in machine vision systems, including but not limited to movable objects, such as aerial vehicles and platforms, autonomous vehicles, boats, or robots, that use machine vision. Unlike prior implementations, the disclosed imaging systems have higher spatial resolutions because they may use all of the camera's sensor pixels when filtering images in different spectral bands. The disclosed embodiments also provide better spectral resolution (e.g., around 10 to 100 nm) than conventional RGB camera systems, and advantageously also provide real-time, lightweight, and cost-effective solutions. The disclosed hyperspectral imaging system may be mass produced at a relatively low cost, promoting progress in robotic vision and machine learning.

According to the disclosed embodiments, the imaging system comprises one or more cameras, each with a corresponding image sensor, that are configured to capture the same scene within each camera's field of view. The imaging system also includes a plurality of bandpass filters that may be positioned in front of the one or more image sensors. Each bandpass filter has a passing band that allows the transmission of incident electromagnetic signals between a first and second wavelength associated with the filter. For example, a first bandpass filter in the system may have a passing band between 500 nm to 550 nm, and a second bandpass filter may have a passing band between a different pair of wavelengths, e.g., 610 nm to 640 nm. Further to the disclosed embodiments, each bandpass filter has a different passing band, which may or may not overlap the passing bands of the other filters in the system. Accordingly, when the different bandpass filters are positioned in front of the one or more image sensors, each image sensor of the one or more cameras captures a different spectral image, i.e., containing only certain frequency components of the same scene being imaged in the cameras' field of view.

The disclosed embodiments are not limited to any particular physical configurations between the cameras and bandpass filters. For example, a plurality of cameras may be arranged in a linear or multi-dimensional array, such that a different bandpass filter may be positioned in front of each camera. In other disclosed embodiments, the imaging system may comprise a rotatable stage on which at least some of the plurality of bandpass filters are mounted. In such embodiments, a rotation mechanism may be configured to rotate the rotatable stage, causing at least one of the mounted bandpass filters to align with at least one camera. In other disclosed embodiments, the imaging system may comprise a translation stage on which at least some of the bandpass filters are mounted, and a translation mechanism configured to move the translation stage in an axial direction or along a defined path, e.g., on a track, and cause at least one of the mounted bandpass filters to align with at least one camera. Further, the bandpass filters may be positioned in front of a camera's image sensor, and in some embodiments may be positioned separated from the camera's sensor by one or more other components, such as at least one optical lens, polarizer, or other optical components.

The disclosed embodiments also are not limited to any particular numbers or types of cameras or bandpass filters. In some embodiments, for example, the cameras may include at least one gray-scale camera, such as a conventional CCD camera or CMOS camera. The gray-scale cameras may include CCD, rolling-shutter CMOS, global-shutter CMOS, and also may include non-silicon based cameras, such as infrared or thermal cameras. The plurality of bandpass filters may include separate physical filters or a single filter with optical coatings that provide multiple passing bands at different areas on the filter.

In accordance with the disclosed embodiments, the bandwidths of the filters' passing bands (e.g., measured as the difference between the filter's first and second wavelengths) may be between approximately 10 nm and 100 nm and may differ between filters. In some embodiments, each of the bandpass filters has a bandwidth that is determined by dividing a spectral response range of a camera (i.e., a range of wavelengths that may be detected by the camera) by the number of bandpass filters. In these exemplary embodiments, each bandpass filter has an equal bandwidth, and collectively the filter's passing bands cover the entire range of the camera's spectral response. In other embodiments, the passing bands of the bandpass filters may be determined by dividing only a portion of a camera's spectral response range by the number of bandpass filters. In yet other embodiments, the plurality of bandpass filters may cover discontinuous portions of a spectral response range of a camera.

It is to be understood that both the foregoing general description and the following detailed description are exemplary and explanatory only, and are not restrictive of the disclosed embodiments, as claimed. For example, the passing bands and spectral response ranges described herein are referenced in terms of wavelengths merely for ease of explanation. Those skilled in the art will appreciate the disclosed wavelengths may be equivalently expressed as frequencies, and the inventive principles described herein apply equally in the context of wavelengths or frequencies.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

Figure 1:
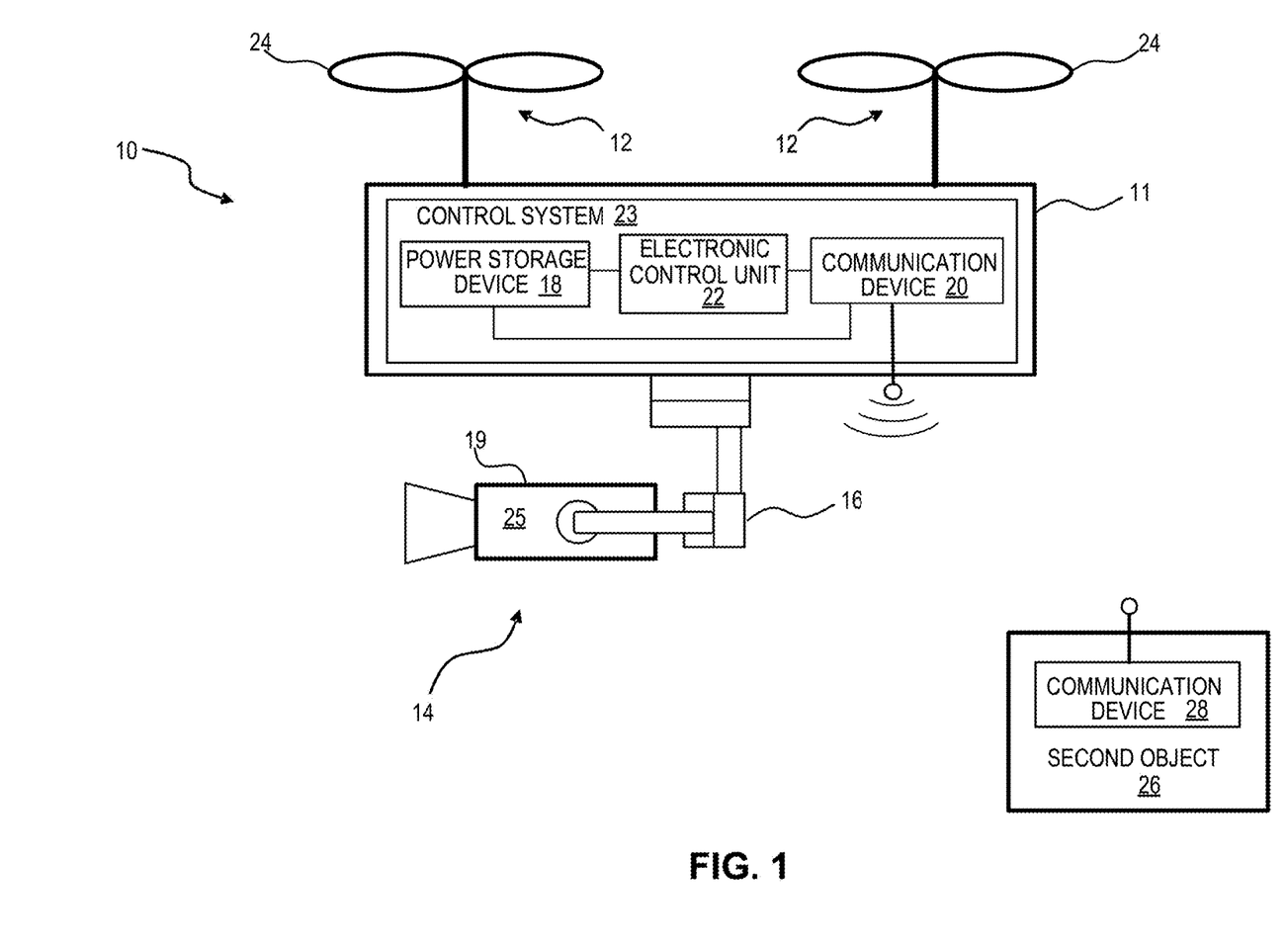
FIG. 1 is a schematic diagram of an exemplary movable object configured to communicate with an exemplary second object in accordance with the disclosed embodiments.

FIG. 1 shows an exemplary movable object 10 that may be configured to move within an environment. Movable object 10 may be any suitable object, device, mechanism, system, or machine configured to travel on or within a suitable medium (e.g., a surface, air, water, one or more rails, space, underground, etc.). For example, movable object 10 may be an unmanned aerial vehicle (UAV). Although movable object 10 is shown and described herein as a UAV for exemplary purposes of this description, it is understood that other types of movable objects (e.g., wheeled objects, nautical objects, locomotive objects, other aerial objects, an aerial vehicle, an aerial platform, an autonomous vehicle, a boat, a robot, etc.) may also or alternatively be used in embodiments consistent with this disclosure. As used herein, the term UAV may refer to an aerial device configured to be operated and/or controlled automatically (e.g., via an electronic control system) and/or manually by off-board personnel.

Movable object 10 may include a housing 11, one or more propulsion assemblies 12, and a payload 14, such as one or more camera systems. In some embodiments, as shown in FIG. 1, payload 14 may be connected or attached to movable object 10 by a carrier 16, which may allow for one or more degrees of relative movement between payload 14 and movable object 10. In other embodiments, payload 14 may be mounted directly to movable object 10 without carrier 16. Movable object 10 may also include a power storage device 18, a communication device 20, and an electronic control unit 22 in communication with the other components. In some embodiments, one or more of power storage device 18, communication device 20, and an electronic control unit 22 may be included in a control system 23. Control system 23 may be configured to control multiple systems or functions of movable object 10. Alternatively, control system 23 may be dedicated to controlling a single system or subset of functions. For example, control system 23 may be or include a flight control system of a UAV, which allows methods to control payload 14.

Movable object 10 may include one or more propulsion assemblies 12 positioned at various locations (for example, top, sides, front, rear, and/or bottom of movable object 10) for propelling and steering movable object 10. Although only two exemplary propulsion assemblies 12 are shown in FIG. 1, it will be appreciated that movable object 10 may include any number of propulsion assemblies (e.g., 1, 2, 3, 4, 5, 10, 15, 20, etc.). Propulsion assemblies 12 may be devices or systems operable to generate forces for sustaining controlled flight. Propulsion assemblies 12 may share or may each separately include at least one power source, such as one or more batteries, fuel cells, solar cells, etc., or combinations thereof. Each propulsion assembly 12 may also include one or more rotary components 24, e.g., within an electric motor, engine, or turbine, coupled to the power source and configured to participate in the generation of forces for sustaining controlled flight. For instance, rotary components 24 may include rotors, propellers, blades, etc., which may be driven on or by a shaft, axle, wheel, or other component or system configured to transfer power from the power source. Propulsion assemblies 12 and/or rotary components 24 may be adjustable (e.g., tiltable) with respect to each other and/or with respect to movable object 10. Alternatively, propulsion assemblies 12 and rotary components 24 may have a fixed orientation with respect to each other and/or movable object 10. In some embodiments, each propulsion assembly 12 may be of the same type. In other embodiments, propulsion assemblies 12 may be of multiple different types. In some embodiments, all propulsion assemblies 12 may be controlled in concert (e.g., all at the same speed and/or angle). In other embodiments, one or more propulsion devices may be independently controlled with respect to, e.g., speed and/or angle.

Propulsion assemblies 12 may be configured to propel movable object 10 in one or more vertical and horizontal directions and to allow movable object 10 to rotate about one or more axes. That is, propulsion assemblies 12 may be configured to provide lift and/or thrust for creating and maintaining translational and rotational movements of movable object 10. For instance, propulsion assemblies 12 may be configured to enable movable object 10 to achieve and maintain desired altitudes, provide thrust for movement in all directions, and provide for steering of movable object 10. In some embodiments, propulsion assemblies 12 may enable movable object 10 to perform vertical takeoffs and landings (i.e., takeoff and landing without horizontal thrust). In other embodiments, movable object 10 may require constant minimum horizontal thrust to achieve and sustain flight. Propulsion assemblies 12 may be configured to enable movement of movable object 10 along and/or about multiple axes.

Payload 14 may include one or more sensory devices 19, such as the exemplary sensory device 19 shown in FIG. 1. Sensory devices 19 may include imaging system 25. Sensory devices 19 may include devices for collecting or generating data or information, such as surveying, tracking, and capturing images or video of targets (e.g., objects, landscapes, subjects of photo or video shoots, etc.). Sensory devices 19 may include one or more imaging devices configured to gather data that may be used to generate images. For example, imaging devices may include photographic cameras (e.g., analog, digital, etc.), video cameras, infrared imaging devices, ultraviolet imaging devices, x-ray devices, ultrasonic imaging devices, radar devices, binocular cameras, etc. In some embodiments, the sensory devices 19 may include a one-dimensional or multi-dimension array of cameras and a plurality of bandpass filters as described further below. Sensory devices 19 may also include devices for capturing audio data, such as microphones or ultrasound detectors. Sensory devices 19 may also or alternatively include other suitable sensors for capturing visual, audio, and/or electromagnetic signals.

Carrier 16 may include one or more devices configured to hold the payload 14 and/or allow the payload 14 to be adjusted (e.g., rotated) with respect to movable object 10. For example, carrier 16 may be a gimbal. Carrier 16 may be configured to allow payload 14 to be rotated about one or more axes, as described below. In some embodiments, carrier 16 may be configured to allow 360° of rotation about each axis to allow for greater control of the perspective of the payload 14. In other embodiments, carrier 16 may limit the range of rotation of payload 14 to less than 360° (e.g., ≤270°, ≤210°, ≤180, ≤120°, ≤90°, ≤45°, ≤30°, ≤15°, etc.), about one or more of its axes.

Communication device 20 may be configured to enable communications of data, information, commands (e.g., flight commands, commands for operating payload 14, etc.), and/or other types of signals between electronic control unit 22 and off-board entities. Communication device 20 may include one or more components configured to send and/or receive signals, such as receivers, transmitters, or transceivers that are configured to carry out one- or two-way communication. Components of communication device 20 may be configured to communicate with off-board entities via one or more communication networks, such as networks configured for WLAN, radio, cellular (e.g., WCDMA, LTE, etc.), WFi, RFID, etc., and using one or more wireless communication protocols (e.g., IEEE 802.15.1, IEEE 802.11, etc.), and/or other types of communication networks or protocols usable to transmit signals indicative of data, information, commands, control, and/or other signals. Communication device 20 may be configured to enable communications with user input devices, such as a control terminal (e.g., a remote control) or other stationary, mobile, or handheld control device, that provide user input for controlling movable object 10 during flight. For example, communication device 20 may be configured to communicate with a second object 26, which may be a user input device or any other device capable of receiving and/or transmitting signals with movable object 10.

Second object 26 may be a stationary device, mobile device, or other type of device configured to communicate with movable object 10 via communication device 20. For example, in some embodiments, the second object 26 may be another movable device (e.g., another UAV), a computer, a terminal, a user input device (e.g., a remote control device), etc. Second object 26 may include a communication device 28 configured to enable wireless communication with movable object 10 (e.g., with communication device 20) or other objects. Communication device 28 may be configured to receive data and information from communication device 20, such as operational data relating to, for example, positional data, velocity data, acceleration data, sensory data (e.g., imaging data), and other data and information relating to movable object 10, its components, and/or its surrounding environment. In some embodiments, second object 26 may include control features, such as levers, buttons, touch screen device, displays, etc. In some embodiments, second object 26 may embody an electronic communication device, such as a smartphone or a tablet, with virtual control features (e.g., graphical user interfaces, applications, etc.).

Figure 2:
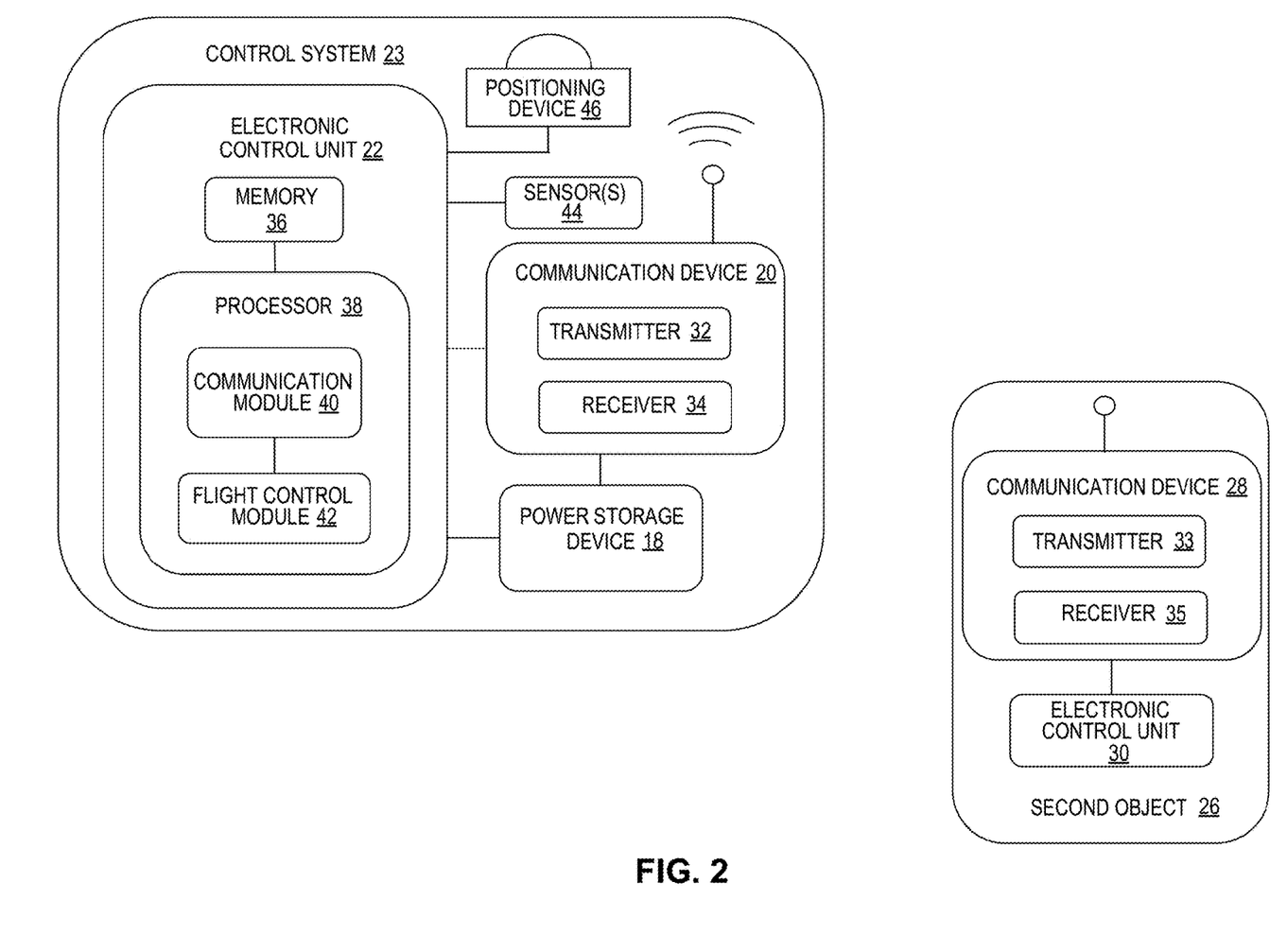
FIG. 2 is a schematic block diagram of an exemplary control system that may be used in accordance with the disclosed embodiments.

FIG. 2 is a schematic block diagram showing an exemplary control system 23 and second object 26 in accordance with the disclosed embodiments. Control system 23 may include the power storage device 18, communication device 20, and electronic control unit 22, among other things. Second object 26 may include, inter alia, a communication device 28 and an electronic control unit 30.

Power storage device 18 may be a device configured to energize or otherwise supply power to electronic components, mechanical components, or combinations thereof in the movable object 10. For example, power storage device 18 may be a battery, a battery bank, or other device. In other embodiments, power storage device 18 may be or include one or more of a combustible fuel, a fuel cell, or another type of power storage device.

Communication device 20 may be an electronic device configured to enable wireless communication with other devices and may include a transmitter 32, receiver 34, circuitry, and/or other components. Transmitter 32 and receiver 34 may be electronic components respectively configured to transmit and receive wireless communication signals. In some embodiments, transmitter 32 and receiver 34 may be separate devices or structures. Alternatively, transmitter 32 and receiver 34 may be combined (or their respective functions may be combined) in a single transceiver device configured to send (i.e., transmit) and receive wireless communication signals, which may include any type of electromagnetic signal encoded with or otherwise indicative of data or information. Transmitter 32 and receiver 34 may be connected to one or more shared antennas, such as the exemplary antenna in FIG. 2, or may transmit and receive using separate antennas or antenna arrays in the movable object 10.

Communication device 20 may be configured to transmit and/or receive data from one or more other devices via suitable means of communication usable to transfer data and information to or from electronic control unit 22. For example, communication device 20 may be configured to utilize one or more local area networks (LAN), wide area networks (WAN), infrared systems, radio systems, Wi-Fi networks, point-to-point (P2P) networks, cellular networks, satellite networks, and the like. Optionally, relay stations, such as towers, satellites, or mobile stations, can be used, as well as any other intermediate nodes that facilitate communications between the movable object 10 and second object 26. Wireless communications can be proximity dependent or proximity independent. In some embodiments, line-of-sight may or may not be required for communications.

Electronic control unit 22 may include one or more components, including, for example, a memory 36 and at least one processor 38. Memory 36 may be or include non-transitory computer readable media and can include one or more memory units of non-transitory computer-readable media. Non-transitory computer-readable media of memory 36 may be or include any type of volatile or non-volatile memory including without limitation floppy disks, hard disks, optical discs, DVDs, CD-ROMs, microdrive, magneto-optical disks, ROMs, RAMs, EPROMs, EEPROMs, DRAMs, VRAMs, flash memory devices, magnetic or optical cards, nanosystems (including molecular memory integrated circuits), or any other type of media or device suitable for storing instructions and/or data. Memory units may include permanent and/or removable portions of non-transitory computer-readable media (e.g., removable media or external storage, such as an SD card, RAM, etc.).

Information and data from sensory devices 19 and/or other devices may be communicated to and stored in non-transitory computer-readable media of memory 36. Non-transitory computer-readable media associated with memory 36 also may be configured to store logic, code and/or program instructions executable by processor 38 to perform any of the illustrative embodiments described herein. For example, non-transitory computer-readable media associated with memory 36 may be configured to store computer-readable instructions that, when executed by processor 38, cause the processor to perform a method comprising one or more steps. The method performed by processor 38 based on the instructions stored in non-transitory computer-readable media of memory 36 may involve processing inputs, such as inputs of data or information stored in the non-transitory computer-readable media of memory 36, inputs received from second object 26, inputs received from sensory devices 19, and/or other inputs received via communication device 20. The non-transitory computer-readable media may be configured to store data obtained or derived from sensory devices 19 to be processed by processor 38 and/or by second object 26 (e.g., via electronic control unit 30). In some embodiments, the non-transitory computer-readable media can be used to store the processing results produced by processor 38.

Processor 38 may include one or more processors and may embody a programmable processor, such as a central processing unit (CPU). Processor 38 may be operatively coupled to memory 36 or another memory device configured to store programs or instructions executable by processor 38 for performing one or more method steps. It is noted that method steps described herein may be embodied by one or more instructions and data stored in memory 36 and that cause the method steps to be carried out when processed by the processor 38.

In some embodiments, processor 38 may include, or alternatively may be operatively coupled to, one or more control modules, such as a communication module 40 and a flight control module 42 in the illustrative embodiment of FIG. 2, described further below. Communication module 40 may be configured to help control aspects of wireless communication between movable object 10 and other objects (e.g., second object 26), such as a transmission power level of communication device 20. Flight module 42 may be configured to help control propulsion assemblies 12 of movable object 10 to adjust the position, orientation, velocity, and/or acceleration of movable object 10 during flight. Communication module 40 and flight control module 42 may be implemented in software for execution on processor 38, or may be implemented in hardware and/or software components at least partially included in, or separate from, the processor 38. For example, communication module 40 and flight control module 42 may include one or more CPUs, ASICs, DSPs, FPGAs, logic circuitry, etc. configured to implement their respective functions, or may share processing resources in processor 38. As used herein, the term "configured to" should be understood to include hardware configurations, software configurations (e.g., programming), and combinations thereof, including when used in conjunction with or to describe any controller, electronic control unit, or module described herein.

The components of electronic control unit 22 can be arranged in any suitable configuration. For example, one or more of the components of the electronic control unit 22 can be located on movable object 10, carrier 16, payload 14, second object 26, sensory device 19, or an additional external device in communication with one or more of the above. In some embodiments, one or more processors or memory devices can be situated at different locations, such as on the movable object 10, carrier 16, payload 14, second object 26, sensory device 19, or on an additional external device in communication with one or more of the above, or suitable combinations thereof, such that any suitable aspect of the processing and/or memory functions performed by the system can occur at one or more of the aforementioned locations.

Second object 26 may include the same or similar components as control system 23 in structure and/or function. For example, communication device 28 of second object 26 may include a transmitter 33 and a receiver 35. Transmitter 33 and receiver 35 may be the same or similar to transmitter 32 and receiver 34, respectively, in structure and/or function and therefore will not be described in detail. Electronic control unit 30 of second object 26 may be the same or similar to electronic control unit 22 in structure (e.g., may include memory, a processor, modules, etc.) and/or function and therefore will not be described in detail.

Control system 23 may receive information ("flight status information" or "status information") relating to flight parameters of movable object 10. The status information may include information indicative of at least one of a movement and a position of the movable object, for example, while the movable object 10 is in flight or at rest. For example, the status information may include one or more of a speed, an acceleration, a heading, or a height (e.g., height above ground, altitude, etc.) of movable object 10, but is not limited thereto and may include other or additional information. Status information may be detected or collected via one or more sensors 44 included in, connected to, or otherwise associated with control system 23. For simplicity, only one exemplary sensor 44 is shown in FIG. 2. At least one sensor 44 may be included in the sensory devices 19. Sensors 44 may include, for example, gyroscopes, accelerometers, pressure sensors (e.g., absolute pressure sensors, differential pressure sensors, etc.), and one or more (e.g., a plurality of) distance sensors, which may include one or more cameras, infrared devices, ultraviolet devices, x-ray devices, ultrasonic devices, radar devices, laser devices, and devices associate with a positioning system (e.g., a global positioning system (GPS), GLONASS, Galileo, Beidou, GAGAN, GNSS, etc.). Distance sensors may be configured to generate signals indicative of a distance between itself and other objects (e.g., second object 26), the ground, etc. Sensors 44 may include other or additional sensors, such as temperature sensors (e.g., thermometers, thermocouples, etc.), motion sensors, inertial measurement sensors, proximity sensors, image sensors, etc.

Figure 3:
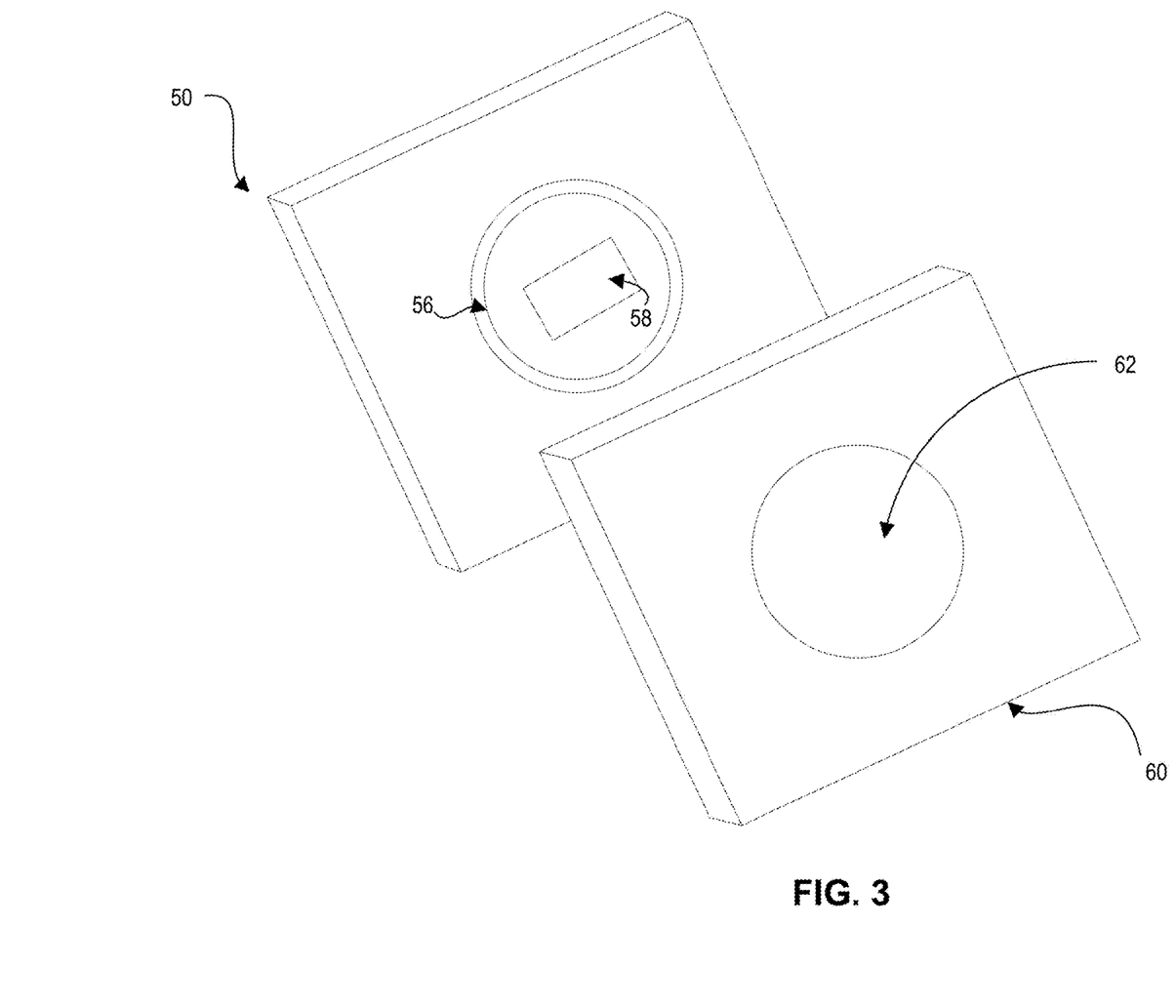
FIG. 3 is a schematic diagram of a camera and a bandpass filter that may be used in an imaging system consistent with the disclosed embodiments.

FIG. 3 is a schematic diagram of an exemplary configuration of a camera 50 and bandpass filter 60 that may be used in accordance with the disclosed embodiments. The illustrative camera 50 and bandpass filter 60 may be mounted among the payload 14 of movable object 10. Alternatively, the camera and bandpass filter may be mounted on any other location on the movable object 10 that permits operation of a hyperspectral imaging system 25 as described herein. Camera 50 and bandpass filter 60 may have any shape or form and are not limited to the shape, size, and form illustrated in FIG. 3.

Camera 50 may be implemented using various types of cameras known in the art. Unlike prior hyperspectral imagining systems, the disclosed embodiments may use lower cost and smaller form-factor CCD and CMOS types of cameras and related optical components. For example, camera 50 may be a grayscale camera or another type of camera that provides luminance or intensity information for a captured image. Camera 50 may be a grayscale camera without any colored filters (e.g., Bayer filters). While camera 50 may capture optical images in the visible spectrum, it also may capture images based on electromagnetic signals outside of the visible spectrum. In some embodiments, for example, camera 50 may capture electromagnetic signals corresponding to infrared waves, thermal waves, ultraviolet waves, x-rays, gamma rays, microwaves, radio waves, etc. Camera 50 may capture images in any portions of the electromagnetic spectrum within the spectral response range of its image sensor 58.

In some disclosed embodiments, camera 50 may be a global-shutter camera (e.g., with exposure times determined by a mechanical shutter), and in other embodiments camera 50 may be a rolling-shutter camera (e.g., with exposure times determined by software and/or hardware in control unit 22). For example, camera 50 may be a rolling-shutter CCD camera, a rolling-shutter CMOS camera, a global-shutter CCD camera, or the like. In other embodiments, camera 50 may comprise a silicon image camera, an infrared camera, or a thermal camera. In yet other possible embodiments, camera 50 may comprise a non-silicon based camera, such as an indium-gallium-arsenide (InGaAs) camera or mercury-cadmium-telluride (HgCdTe) camera, for example, with semiconductor band gaps from around 0.8 micrometers to around 10 micrometers in wavelength.

Camera 50 includes at least one image sensor 58. The image sensor may be a CCD sensor, a CMOS sensor, or any other silicon-based or non-silicon-based sensor capable of detecting incident electromagnetic signals within the sensor's spectral response range. For example, image sensor 58 may be a CMOS or CCD sensor with a spectral response range between approximately 400 nm to approximately 1000 nm. Image sensor 58 may be configured for use in a grayscale camera. In some embodiments, image sensor 58 may be combined with other sensors, such as infrared sensors, thermal sensors, or the like. In other embodiments, image sensor 58 may comprise a video graphics array (VGA) sensor.

In some disclosed embodiments, image sensor 58 includes an array of pixels configured to capture incident electromagnetic signals corresponding to an image in the camera's field of view. For example, the image sensor 58 may convert incident electromagnetic signals into an array of digital data that may be stored in memory 36 and/or processed by the processor 38. In some embodiments, each pixel in the image sensor 58 may generate an analog representation (sample) of a portion of the incident image, and the camera 50 may include an analog-to-digital converter (not shown) that converts each pixel's analog sample into a digital representation.

One or more components, such as optical lenses and/or polarizers, may be positioned between the camera's image sensor 58 and the bandpass filter 60. In the exemplary embodiment in FIG. 3, for example, camera 50 includes an imaging lens 56 that may facilitate focusing the incident image onto the array of pixels in the image sensor 58. In other embodiments, camera 50 may include multiple imaging lenses 56, or alternatively, no imaging lens at all. In other embodiments, camera 50 may include a polarizing filter to increase spatial recognition on the image sensor 58. In some disclosed embodiments, camera 50 (and image sensor 58) does not include any conventional red, green, blue (RGB) filters.

The exemplary imaging lens 56 may have a smaller profile (e.g., form factor and/or thickness) as compared with lenses used in existing hyperspectral imaging systems. For example, a smaller imaging lens 56 may decrease the width of the camera 50 as compared with prior art systems. Also, in some embodiments, the camera 50 may have a relatively large aperture (e.g., bigger than a pinhole), and in other embodiments camera 50 may have an aperture the same size or smaller than a pinhole. In some embodiments, the size of the camera's aperture may be adjustable.

Bandpass filter 60 may be placed in front of camera 50. Bandpass filter 60 includes an active filter area 62, e.g., where incident electromagnetic signals (which may include but is not limited to visible light) is filtered. The filter area 62 is adapted to pass only certain frequencies (e.g., with wavelengths between a first wavelength and a second wavelength) in a predetermined passing band. In the disclosed embodiments, the bandpass filter 60 is positioned, so the signals that pass through the filter area 62 (and possibly also through one or more imaging lenses 56) become incident on the image sensor 58. Although FIG. 3 shows the exemplary bandpass filter 60 as a separate module relative to camera 50, those skilled in the art will appreciate that the bandpass filter 60 alternatively may be attached to the camera 50 or otherwise located within a common assembly as the camera. For example, bandpass filter 60 may be positioned between image sensor 58 and imaging lens 56 in a common camera assembly, or more generally may be positioned anywhere in front of the image sensor 58.

Filter area 62 may cover the full area of bandpass filter 60, or alternatively, may cover only a subset of the full area of bandpass filter 60. In some embodiments, the bandpass filter 60 may contain multiple filter areas 62, each with a different respective passing band, in which case each filter area 62 may operate as a different bandpass filter with its own passing band. In some embodiments, the bandpass filter 60 includes a plurality of non-overlapping filter areas 62, for example, positioned along an axis (linearly), or arranged in a multi-dimensional array, or arranged in any other pattern on the bandpass filter 60. In such embodiments, each filtering area 62 has a different passing band that allows certain wavelengths of electromagnetic signals through the filter area. In some embodiments, the bandpass filter 60 may include a stop-band filter (not shown) that blocks certain wavelengths of electromagnetic signals through filter area 62. In some embodiments, filter area 62 may comprise optical coatings and materials that provide different passing bands at different areas of the bandpass filter 60. In practice, each filter area 62 on bandpass filter 60 may be coated differently to provide desired passing bands and/or stop bands for filtering incident electromagnetic signals.

Additional optical components (not shown in FIG. 3) also may be positioned behind or in front of the bandpass filter 60. As discussed in more detail below, bandpass filter 60 may be mounted on a movable stage, for example, whose position is controlled by processor 38 or another controller in the control system 23. That is, processor 38 may instruct a movable stage, including the bandpass filter 60, to translate and/or rotate a bandpass filter 60 relative to the position of the camera 50 and cause the bandpass filter 60 to align with an aperture and/or image sensor 58 in the camera.

Figure 4:
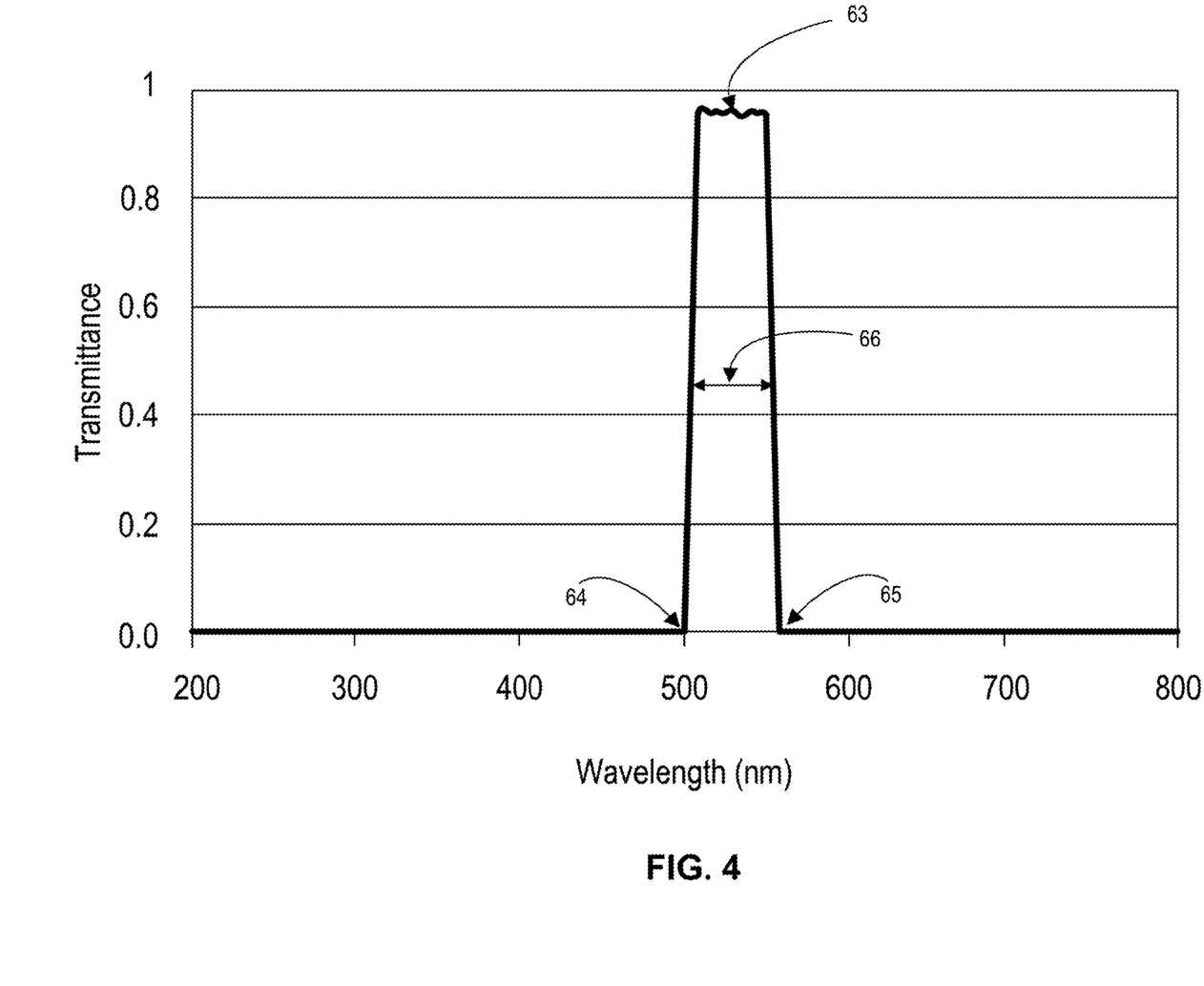
FIG. 4 is a graph showing an exemplary passing band of a bandpass filter that may be used in accordance with the disclosed embodiments.

FIG. 4 is a graph of illustrating an exemplary passing band 63 of a filter area 62. In FIG. 4, the transmittance of incident electromagnetic signals is plotted as a function of incident wavelengths. The bandpass filter's passing band 63 corresponds to those electromagnetic signals that are permitted to be transmitted through the filter area 62 without significant attenuation. As shown in exemplary FIG. 4, passing band 63 corresponds to incident signals having wavelengths between a first wavelength 64 and second wavelength 65, e.g., shown as approximately 500 nm and 550 nm only for purposes of illustration. The bandwidth 66 of passing band 63 may be determined as the difference between the wavelengths 64 and 65. In some embodiments, bandwidth 66 may be approximated as the full width at half maximum of the passing band, as shown in exemplary FIG. 4. In the alternative, the lower and upper wavelengths (or frequencies) 64 and 65 of passing band 63 may be determined by any other means or measurements understood to a person skilled in the art. Preferably, the bandwidth 66 is between around 10 nm and around 100 nm, for example around 30 nm. In other embodiments, however, the bandwidth 66 may be less than 10 nm or greater than 100 nm.

Figure 5:
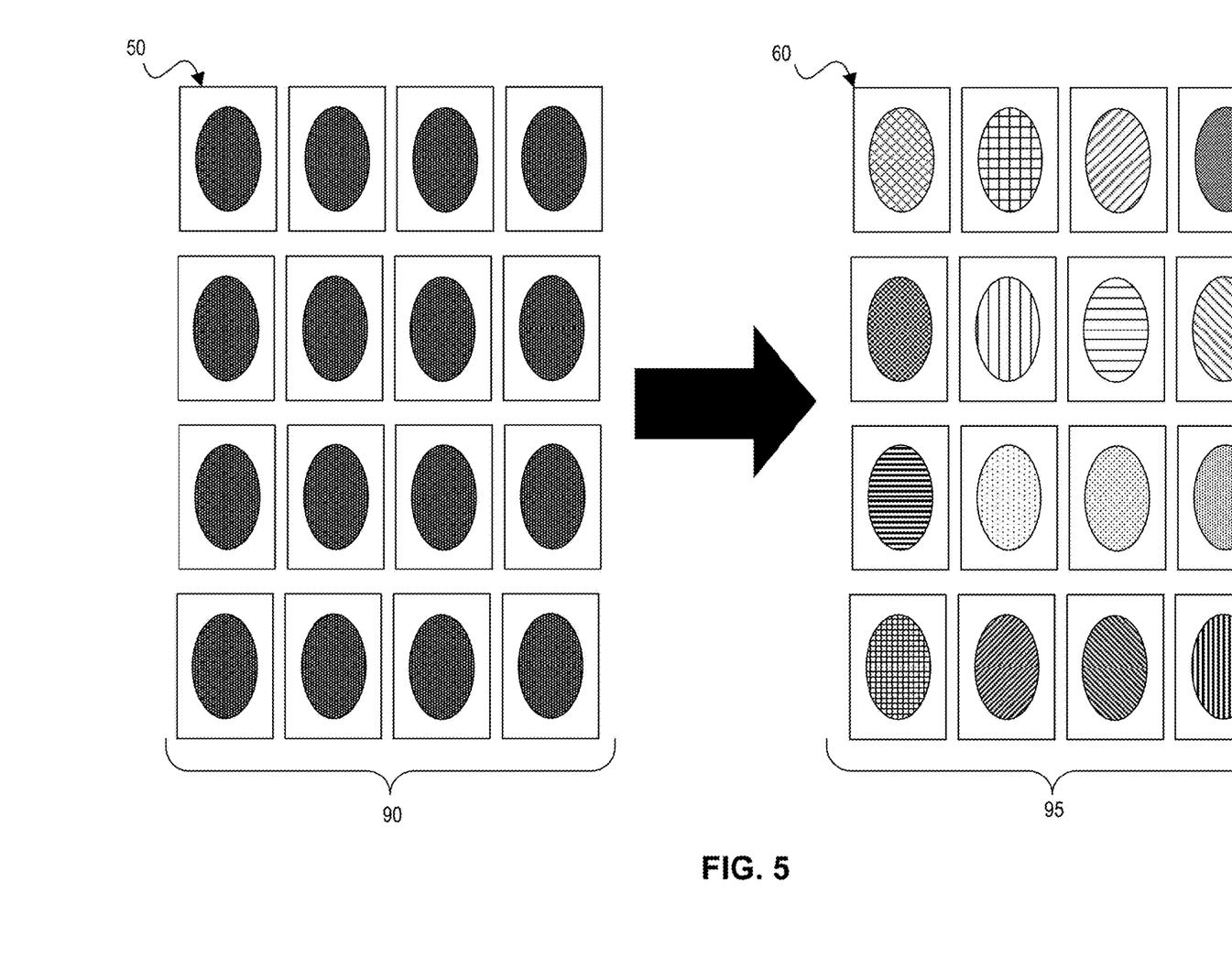
FIG. 5 is a schematic diagram of an exemplary array of cameras and corresponding array of bandpass filters that may be used in accordance with the disclosed embodiments.

FIG. 5 is a schematic block diagram of a two-dimensional array of cameras 50 and bandpass filters 60 that may be used in accordance with certain disclosed embodiments. The arrangement of cameras and filters shown in FIG. 5 is exemplary, as there may be any number and arrangement of cameras 50, and any number and arrangement of bandpass filters 60 in the disclosed embodiments. In some implementations, there may be more bandpass filters 60 than cameras 50 or vice versa, so long as each camera 50 has a bandpass filter 60 positioned in front of it to filter incident signals. The cameras 50 and/or bandpass filters 60 alternatively may be arranged in a one-dimensional array or a three-dimensional array, depending on implementation. Preferably, each of the cameras 50 is the same type of camera containing the same type of image sensor 58. For example, the cameras 50 each may be the same camera model manufactured by the same manufacturer.

Further to the disclosed embodiments, each of the cameras 50 is configured to capture an image including the same scene within the camera's field of view. In the exemplary embodiment of FIG. 5, each camera 50 in a camera array 90 is located at a fixed position and a bandpass filter 60 is located at a corresponding fixed position in a filter array 95 aligned with the camera array, so incident electromagnetic signals are filtered before being detected by each camera. In some embodiments, the cameras 50 may be configured to capture images at or around the same time. The cameras 50 also may be controlled to capture images of the scene in any other order, such as sequentially or at random or timed intervals. In some embodiments, only a subset of the cameras 50 may be used to capture images of the same scene.

Alternatively, a single camera 50 may capture multiple images of the scene, for example, when different bandpass filters 60 are sequentially positioned in front of the camera 50, allowing camera 50 to capture different spectral images of the same scene.

In the disclosed embodiments, each of the filters 60 has a different passing band 63. In some embodiments, the passing bands 63 of the bandpass filters 60 may be non-overlapping so each camera 50 captures an image (spectral image) of the same scene in a different spectral range. In other embodiments, at least one of the bandpass filter passing bands 63 may overlap a passing band of another bandpass filter 60 in the imaging system 25. At least a portion of the spectral images captured by the cameras 50 may be processed, e.g., using processor 38 or another processor, to recreate the image of the scene, identify certain features or objects in the scene, or for any other image-processing function or routine that may operate on different spectral images of the same scene. In some embodiments, control system 23 may correlate corresponding pixels in the spectral images captured by cameras 50 to create a composite image. The spectral images captured by the cameras, and any derived composite images, may be stored in memory 36 and, in some embodiments, may be stored with other related information, such as location information, obtained from sensory devices 19.

Figure 6:
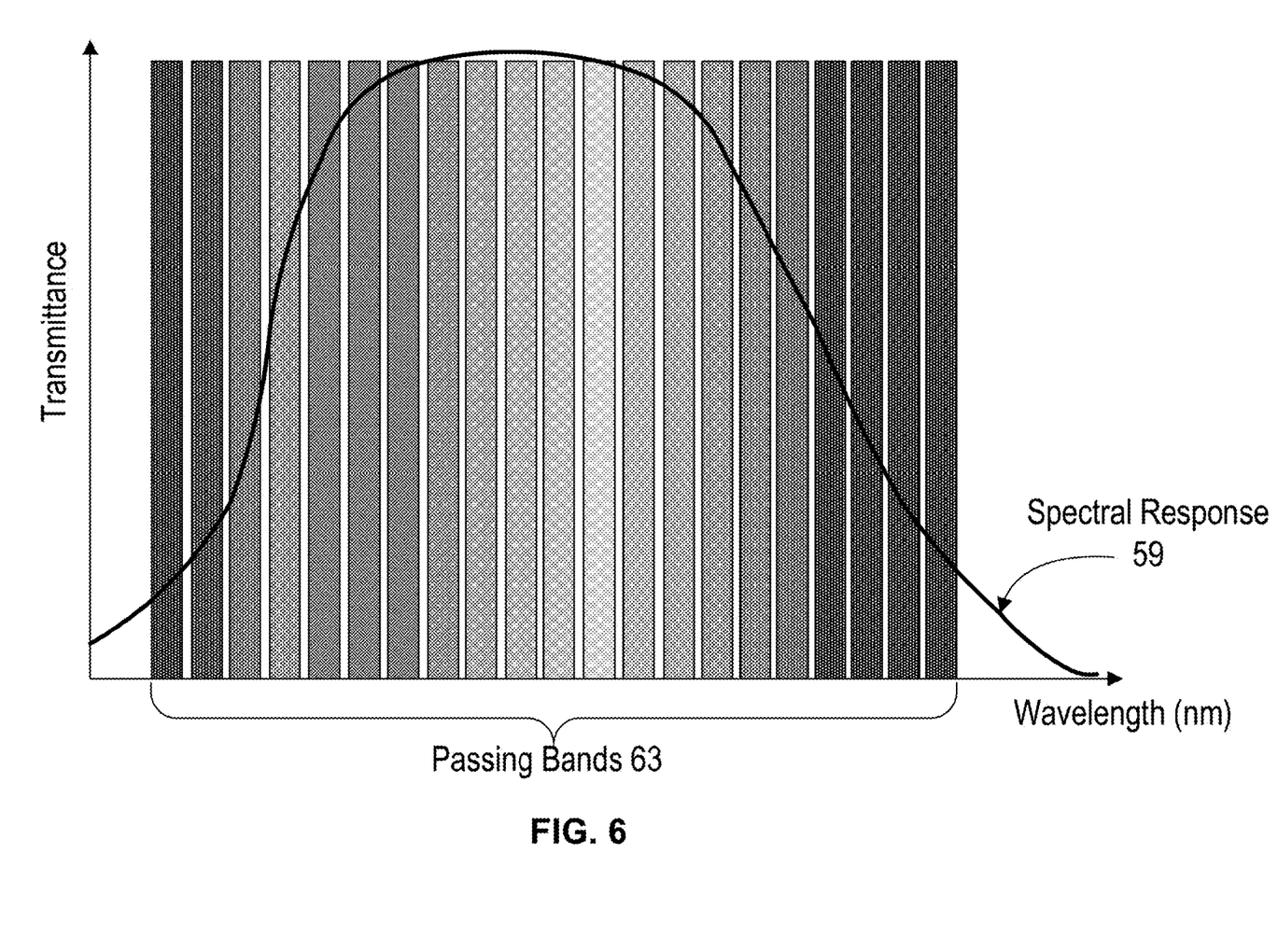
FIG. 6 is a graph illustrating a plurality of exemplary passing bands of bandpass filters spanning the spectral response range of a camera's image sensor that may be used in accordance with certain disclosed embodiments.

FIG. 6 is a graph illustrating an exemplary embodiment in which a plurality of bandpass filter's passing bands 63 spans the entire spectral response range 59 of an image sensor 58 in a camera, consistent with certain disclosed embodiments. The exemplary spectral response range 59 may correspond to one or more of the cameras 50. For example, the spectral response range may correspond to an image sensor 58 having a CMOS or CCD sensor with a spectral response range from approximately 400 nm to 1000 nm. Of course, other spectral response ranges may be used in accordance with the disclosed embodiments.

In some embodiments, the bandwidths 66 of the passing bands 63 are identical and determined by dividing the entire spectral response range 59, or any portion of the spectral response range, by the number of bandpass filters 60. In the event any of the bandpass filters 60 has multiple filter areas 62, then the bandwidths 66 of the passing bands 63 alternatively may be determined by dividing the entire spectral response range 59, or any portion of the spectral response range, by the number of filter areas 62. In such embodiments, the spectral response range 59 (or a portion thereof) may be partitioned equally by different passing bands 63. In other disclosed embodiments, adjacent passing bands 63 may be separated by a "guard band" of wavelengths that are not within any of the filters' passing bands. In yet other embodiments, the passing bands 63 may be selected to cover at least one discontinuous range of wavelengths in the spectral response range 59. To illustrate by way of example, the spectral response range 59 could be between 400 nm and 1000 nm, where none of the passing bands 63 are configured to filter a wavelength range between 500 nm to 525 nm.

Figure 7:
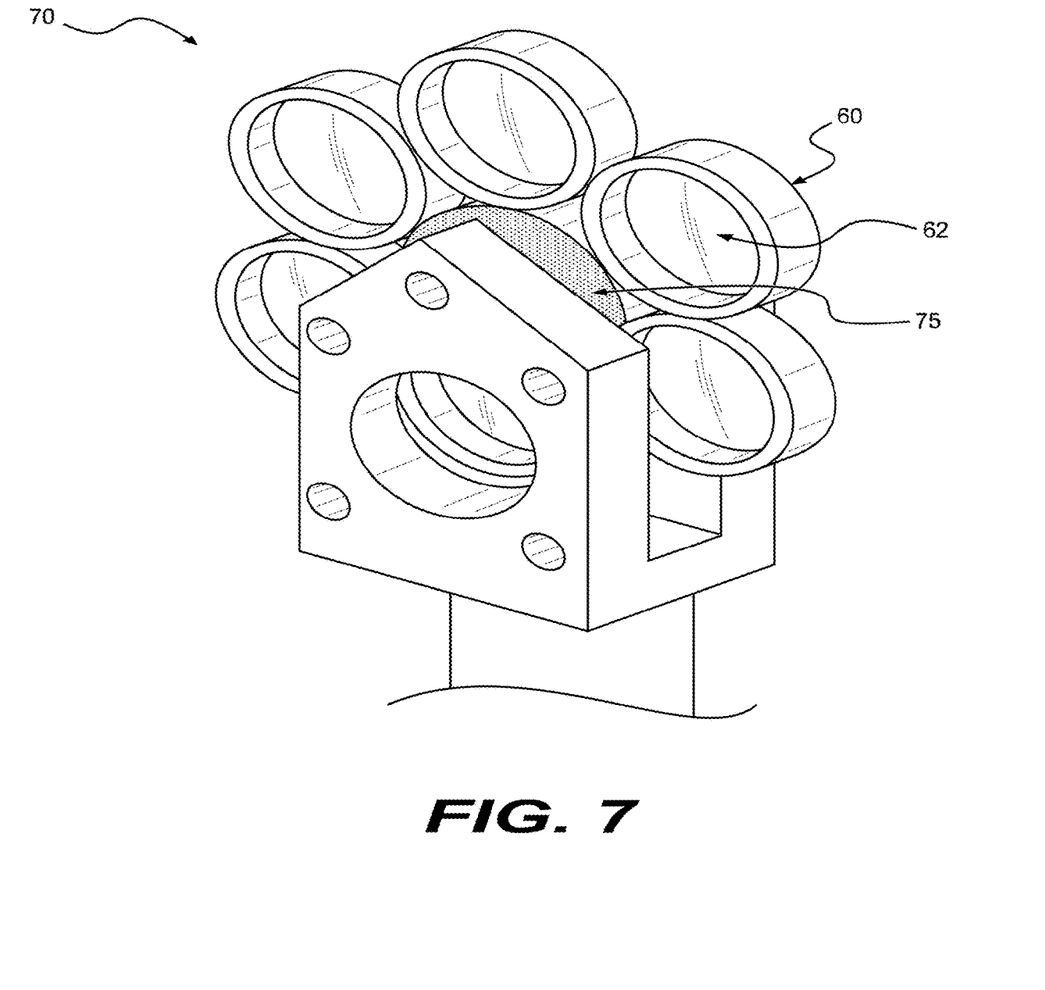
FIG. 7 is a schematic diagram of an exemplary arrangement of bandpass filters mounted on a rotatable stage that may be used in accordance with certain disclosed embodiments.

FIG. 7 is a schematic diagram of an exemplary rotatable stage 70 having a rotation mechanism 75 on which a plurality of bandpass filters 60 is mounted in accordance with certain disclosed embodiments. In this example, the rotatable stage is a wheel on which a plurality of bandpass filters 60 is mounted at fixed positions. This implementation in FIG. 7 is merely exemplary, and those skilled in the art will appreciate that other implementations are possible consistent with the disclosed embodiments. In some embodiments, the rotatable stage 70 may be further mounted on one or more adjustable translation stages (not shown) to enable more precise alignments of the filter areas 62 on the rotatable stage 70 with one or more image sensors 58 and/or apertures of cameras 50 in the imaging system 25. The rotation mechanism 75 may be controlled by processor 38 or any other processor that rotates the rotatable stage 70 on which the bandpass filters 60 are mounted, to align one or more of the bandpass filters 60 with cameras 50 in the imaging system 25.

In some embodiments, rotation mechanism 75 may include one or more of a wheel system, gear system, pulley system, or any other system that would cause bandpass filters 60 to rotate in front of one or more cameras 50 in the imaging system 25. In some embodiments, rotation mechanism 75 may be able to rotate in multiple directions. In some embodiments, one or more cameras may be mounted on the rotatable stage, in which case the rotation mechanism 75 may cause the cameras 50 to rotate and align with corresponding bandpass filters 60. In further disclosed embodiments, multiple rotation mechanisms 75 and/or translation mechanisms may be configured to move one or more cameras 50 and/or bandpass filters 60 in one or more different directions to effect their desired alignments.

Figure 8:
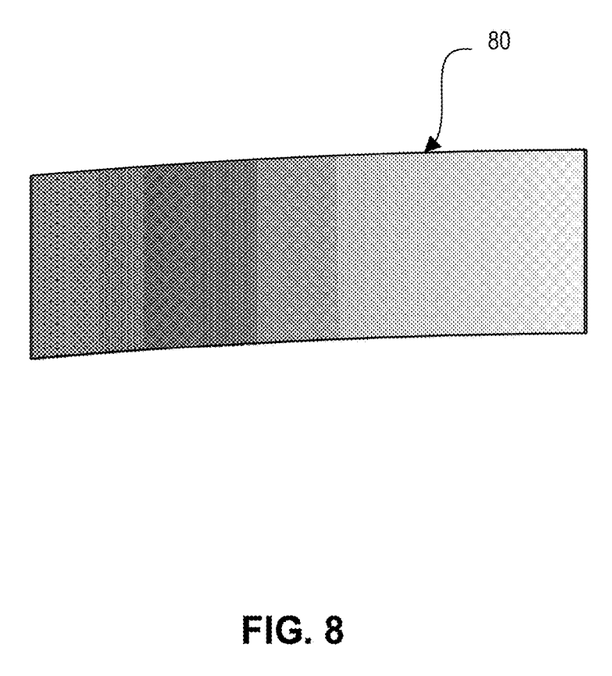
FIG. 8 is a schematic diagram of an exemplary arrangement of bandpass filters formed at different regions on an optical substrate, and that may be mounted on a translation stage that may be used in accordance with certain disclosed embodiments.

FIG. 8 is a schematic diagram of an exemplary bandpass filter 80 having a plurality of filter areas 62 located at different positions in accordance with certain disclosed embodiments. In the example shown, bandpass filter 80 comprises an optical substrate, such as glass, plastic, or other substrate material that allows transmission of wavelengths in the spectral response range of the cameras 50. Bandpass filter 80 also includes optical coatings on the substrate that provide different passing bands 66 at different filter areas on the filter 80. The optical coatings may define different distinct filter areas on the bandpass filter 80 or may comprise a continuous gradient of passing bands as a function of position on the filter 80. Those skilled in the art will understand that another possible implementation may manufacture or otherwise embed separate filter areas 62 at different locations of the same bandpass filter.

The bandpass filter 80 may be attached to at least one translation stage that can be moved in an axial (linear) direction, or along a defined linear or non-linear path, e.g. on a track, by a translation mechanism controlled by processor 38 or any other processor in the imaging system 25. Alternatively, one or more separate bandpass filters 60 may be mounted at predetermined locations on a translation stage and moved in an axial direction or along a defined path, e.g., on a track, when driven by the translation mechanism. In some embodiments, the translation mechanism may include at least one of a bracket system, a sliding system, a pulley system, a crank system, or the like that would cause a desired filter area to align with an image sensor 58 and/or aperture of a camera 50. In some embodiments, a translation mechanism may be able to move the translation stage in different directions. In other embodiments, one or more cameras 50 may be mounted on a translation stage, in which case a translation mechanism may cause at least one camera 50 to align with a desired filter area 62, e.g., on bandpass filter 80.

Descriptions of the disclosed embodiments are not exhaustive and are not limited to the precise forms or embodiments disclosed. For example, the filtered images (spectral images) in the disclosed embodiments may be further processed and/or combined to identify certain spatial features in a scene, create 3D images of the scene, or any other image processing. Different filtered images, respectively generated by bandpass filters having different passing bands, may be combined to form one or more composite images. In some embodiments, the filtered images may be used to detect an object or feature in a scene, or otherwise characterize aspects or properties of the filtered images, for example, using computer vision or deep learning methods. As another example, the filtered images may be used to determine three-dimensional depths of objects or features in a scene, for example, using a triangulation method or other technique applied to the filtered images. In some embodiments, filtered images can be combined in a manner that facilitates identifying spatial differences of the same object in different images, e.g., to determine a three-dimensional depth of the object. The cameras 50 may have stereo-vision or multi-vision capabilities that also may be used for measuring depth.

Typically, ambient light illumination will determine the reflectance spectrum of objects in a scene being imaged by the imaging system 25, and thus different illuminating conditions may produce different hyperspectral images. For example, indoor light-emitting diode (LED) lighting typically lacks infrared spectrum, while tungsten bulbs or the sun have a more or less black body spectrum related to temperature. These changes may be considered when creating a hyperspectral image based on the spectral images obtained from the cameras 50. In some embodiments, one or more additional light sources may be placed in this system, for example, one or more LEDs with specific wavelengths may be used to probe certain wavelengths or a tungsten light bulb may be used to provide a more or less flat spectrum.

In addition, other cameras, sensors, or imaging systems may be combined with the disclosed embodiments in any combination. For example, an infrared image sensor may be used to capture infrared waves. Other cameras, sensors, or imaging systems may include one or more of an RGB camera, a light detection and ranging (LiDAR) sensor, an ultrasonic sensor, a pressure sensor, a temperature sensor, a pressure sensor, or the like. The disclosed rotatable and translation stages, and rotation and translation mechanisms may be replaced with any other mechanisms or techniques for selectively positioning at least one of a plurality of bandpass filters 60 in front of one or more corresponding cameras 50 in the imaging system 25.

Moreover, additional spectroscopic information can be obtained by using polarizing filters in the imaging system 25 of the disclosed embodiments. For example, imaging system 25 disclosed herein may comprise two identical bandpass filters 60, e.g., each having passing bands between around 550 nm to 600 nm, but their corresponding cameras 50 may capture different spectral images because different polarizers, e.g., with horizontal and vertical passing polarizations, are also respectively positioned before or after each of these bandpass filters. Through analyzing the filtered signal differences due to the different polarizers, certain reflecting objects may be detected, such as glass, water surfaces, etc., in the cameras' spectral images by software executing on the processor 38 or any other processor.

Those skilled in the art will also appreciate that the cameras 50 may be placed to view roughly the same scene and take shots at the same or different times. The disclosed embodiments may employ one or more calibration algorithms to help correlate pixels in images obtained by different cameras 50, for example, to recognize objects in each of the images. For example, an object may be recognized based on intensities in captured spectral images from one or more cameras, for example, from twenty cameras. In this example, an array of twenty intensities related to the reflection spectrum of this object may be extracted from the spectral images captured by the twenty cameras. The intensity array for the object could be stored in memory and used for machine learning or supervised learning. The intensity array also may be used for unsupervised learning. This is only one exemplary usage of the hyperspectral system data. Those skilled in the art will further recognize other usages can also be applied, for example, for spatial-feature extraction.

Modifications and adaptations of the embodiments will be apparent from consideration of the specification and practice of the disclosed embodiments. For example, the described implementations include hardware, firmware, and software, but systems and techniques consistent with the present disclosure may be implemented as hardware alone. Additionally, the disclosed embodiments are not limited to the examples discussed herein.

Computer programs based on the written description and methods of this specification are within the skill of a software developer. The various programs or program modules may be created using a variety of programming techniques. For example, program sections or program modules may be designed in or by means of Java, C, C++, assembly language, or any such programming languages. One or more of such software sections or modules may be integrated into a computer system, non-transitory computer-readable media, or existing communications software.

While illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps or inserting or deleting steps. It is intended, therefore, that the specification and examples be considered as exemplary only, with the true scope and spirit being indicated by the following claims and their full scope of equivalents.

What is claimed is:

1. An imaging system, comprising:
   one or more cameras, each camera comprising an image sensor;
   a plurality of bandpass filters each having a respective passing band that permits signals between a first wavelength and a second wavelength of the respective passing band to pass to at least one image sensor in the imaging system;
   a movable stage on which at least some of the plurality of bandpass filters are mounted; and
   a mechanism configured to move the movable stage and cause at least one of the plurality of bandpass filters to align with at least one camera in the imaging system.

2. The imaging system of claim 1, wherein the imaging system comprises multiple cameras arranged in a linear array of cameras, one of the plurality of bandpass filters positioned in front of each camera's image sensor.

3. The imaging system of claim 1, wherein the imaging system comprises multiple cameras arranged in a multidimensional array of cameras, one of the plurality of bandpass filters positioned in front of each camera's image sensor.

4. The imaging system of claim 1, wherein:
   the movable stage is a rotatable stage; and
   the mechanism is a rotation mechanism configured to rotate the rotatable stage.

5. The imaging system of claim 4, wherein the rotation mechanism rotates the rotatable stage to cause a different bandpass filter to align with at least one camera in the imaging system after each image is taken.

6. The imaging system of claim 1, wherein:
the movable stage is a translation stage; and
the mechanism is a translation mechanism configured to move the translation stage in an axial direction.

7. The imaging system of claim 6, wherein the translation mechanism moves the translation stage to cause a different bandpass filter to align with at least one camera in the imaging system after each image is taken.

8. The imaging system of claim 1, further comprising at least one processor configured to combine images that have been filtered by the plurality of bandpass filters and captured by at least one camera in the imaging system.

9. The imaging system of claim 1, wherein at least one camera in the imaging system does not include color filters.

10. The imaging system of claim 1, wherein at least one camera in the imaging system comprises one of a charged coupled device (CCD) camera or a complementary metal-oxide semiconductor (CMOS) camera.

11. The imaging system of claim 1, wherein the plurality of bandpass filters have non-overlapping passing bands.

12. The imaging system of claim 1, wherein the first and second wavelengths for the respective passing band are approximated as lower and upper wavelengths at half maximum of that passing band.

13. The imaging system of claim 1, wherein the difference between the first and second wavelengths defines a bandwidth, and each of the plurality of bandpass filters has a bandwidth substantially between 10 nm and 100 nm.

14. The imaging system of claim 1, wherein the difference between the first and second wavelengths defines a bandwidth, and each of the plurality of bandpass filters has a bandwidth determined by dividing a spectral response range of one of the cameras by the number of bandpass filters.

15. The imaging system of claim 1, wherein the difference between the first and second wavelengths defines a bandwidth, and each of the plurality of bandpass filters has a bandwidth determined by dividing a portion of a spectral response range of a camera by the number of bandpass filters.

16. The imaging system of claim 1, wherein the passing bands of the plurality of bandpass filters cover discontinuous portions of a spectral response range of a camera in the imaging system.

17. A method for filtering an image in an imaging system having one or more cameras, each camera comprising an image sensor, and a plurality of bandpass filters mounted on a movable stage, the method comprising:
using a mechanism to move the movable stage to position at least one of the plurality of bandpass filters in front of at least one image sensor in the imaging system, wherein each bandpass filter has a passing band that permits signals to pass between a first wavelength and a second wavelength and each bandpass filter has a different passing band; and
using the one or more cameras to capture images that have been filtered by the plurality of bandpass filters.

18. The method of claim 17, wherein the mechanism is a rotation mechanism, and the movable stage is a rotatable stage;
the method further comprising rotating, by the rotation mechanism, the movable stage to cause at least one of the plurality of bandpass filters to align with at least one camera in the imaging system.

19. The method of claim 17, wherein the mechanism is a translation mechanism, and the moveable stage is a translation stage;
the method further comprising translating, by the translation mechanism, at least one of the plurality of bandpass filters to align with at least one camera in the imagining system.

20. The method of claim 17, further comprising combining images that have been filtered by bandpass filters in the plurality of bandpass filters and captured by the one or more cameras.

21. The method of claim 20, further comprising using at least one of computer vision and deep learning methods to detect an object in the combined images.

22. The method of claim 20, further comprising using the combined images to determine a depth of at least one object in the images.

23. The method of claim 17, wherein the difference between the first and second wavelengths defines a bandwidth, and each of the plurality of bandpass filters has a bandwidth determined by dividing a spectral response range of one of the cameras by the number of bandpass filters.

24. A movable object, comprising:
one or more cameras, each camera comprising an image sensor;
a plurality of bandpass filters each having a respective passing band that permits signals to pass between a first wavelength and a second wavelength of the respective passing band, wherein one or more of the plurality of bandpass filters with different respective passing bands are positioned in front of each image sensor in the movable object;
a movable stage on which at least some of the plurality of bandpass filters are mounted; and
a mechanism configured to move the movable stage and cause at least one of the plurality of bandpass filters to align with at least one camera.

* * * * *